(12) United States Patent
Brown (10) Patent No.: US 7,205,728 B2
(45) Date of Patent: Apr. 17, 2007

(54) ACTIVE MATRIX LIQUID CRYSTAL DISPLAY

(75) Inventor: Christopher James Brown, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 127 days.

(21) Appl. No.: 11/051,528

(22) Filed: Feb. 4, 2005

(65) Prior Publication Data
US 2005/0200310 A1    Sep. 15, 2005

(30) Foreign Application Priority Data
Feb. 7, 2004    (GB) .................................. 0402713.2

(51) Int. Cl.
*G05F 1/00*     (2006.01)
*G09G 3/10*     (2006.01)

(52) U.S. Cl. .................................... 315/291; 315/169.3
(58) Field of Classification Search ............ 315/169.1, 315/169.3, 169.4; 345/55, 76, 87, 90, 102; 315/291, 307
See application file for complete search history.

(56) References Cited

U.S. PATENT DOCUMENTS

| | | | | |
|---|---|---|---|---|
| 5,838,290 | A * | 11/1998 | Kuijk ......................... | 345/91 |
| 6,243,069 | B1 * | 6/2001 | Ogawa et al. .............. | 345/102 |
| 6,738,031 | B2 * | 5/2004 | Young et al. ................. | 345/55 |
| 6,989,826 | B2 * | 1/2006 | Kasai ......................... | 345/204 |
| 2005/0156854 | A1 * | 7/2005 | Park et al. .................. | 345/100 |

* cited by examiner

*Primary Examiner*—Shih-Chao Chen
*Assistant Examiner*—Minh Dieu A
(74) *Attorney, Agent, or Firm*—Renner, Otto, Boisselle & Sklar, LLP (57) ABSTRACT

An active matrix liquid crystal display (1) comprises a display substrate (2) on which are formed a pixel matrix (3) and source and gate line drivers (4, 5) formed with polysilicon thin film transistors. A DC-DC converter (9) is also formed on the substrate (2) and converts an incoming supply voltage to a higher voltage needed to operate the transistors and the pixels formed on the substrate (2). The converter (9) comprises a voltage-boosting circuit (11) which is powered, at least during a start-up phase of operation of the display (1) by a photovoltaic cell (10) illuminated by a backlight (8) of the display (1). The cell (10) supplies sufficient power to the converter (9) so that it can convert the incoming supply voltage to the higher supply voltage required by the circuitry on the substrate (2). The output voltage of the circuit (11) may subsequently be used to power the circuit itself so that the backlight (8) may be switched off if it is not required for display purposes following the start-up operation.

18 Claims, 11 Drawing Sheets

ACTIVE MATRIX LIQUID CRYSTAL DISPLAY

BACKGROUND OF THE INVENTION

1. Field of the Invention

The present invention relates to an active matrix liquid crystal display.

2. Description of the Related Art

Active Matrix Liquid Crystal Displays (AMLCDs) may be fabricated with polysilicon thin film transistors (TFTs) such that display driver circuitry is integrated onto the same substrate as the active matrix. Such TFTs may exhibit threshold voltages significantly greater than those exhibited by transistors fabricated in a standard CMOS IC (integrated circuit) process. Consequently, the TFT circuitry requires a significantly higher supply voltage than CMOS ICs. In addition, the switching voltage of the liquid crystal material may be significantly larger than the supply voltage of a CMOS IC.

Figure 1:
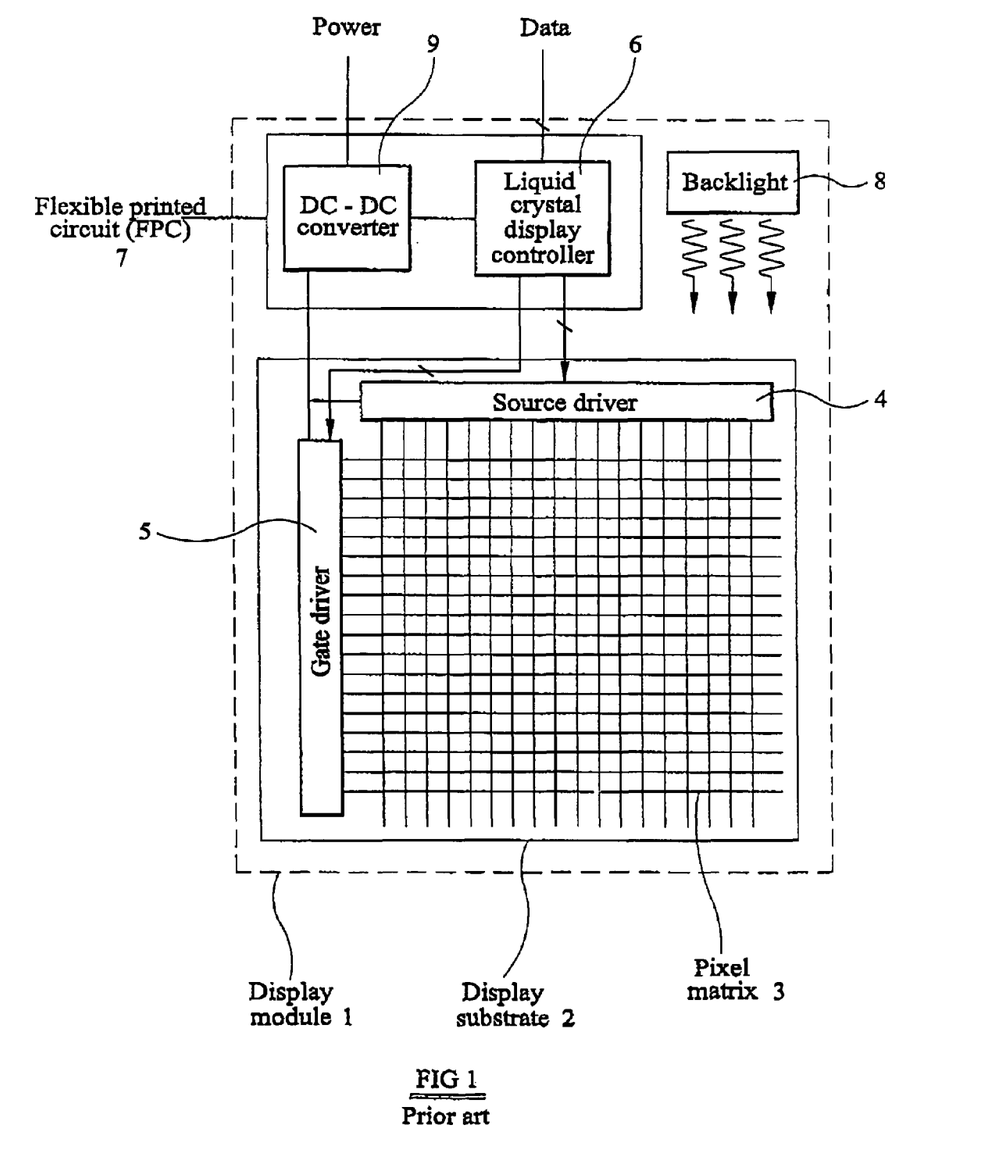
FIG. 1 is a block schematic diagram of a known type of AMLCD.

As shown in FIG. 1 of the accompanying drawings, a known AMLCD module 1 comprises: a display substrate 2 with an active matrix 3 of pixels (picture elements); source and gate line driver circuits 4, 5 integrated on the display substrate 2; a liquid crystal display controller (LCDC) IC 6; a flexible printed circuit (FPC) 7 on which the LCDC 6 is mounted; and a backlight 8. In order to minimise power consumption of the display module 1, it is desirable to supply the module with as low a power supply voltage as possible. This will typically be the supply voltage required by the liquid crystal display controller 6. The display module 1 must then also contain a DC-DC converter 9 as a means of boosting the supply voltage to the level required by the integrated TFT circuitry. The DC-DC converter 9 is typically included in the module in the form of an IC chip and may be found, along with the LCDC 6, on the FPC 7.

Figure 2:
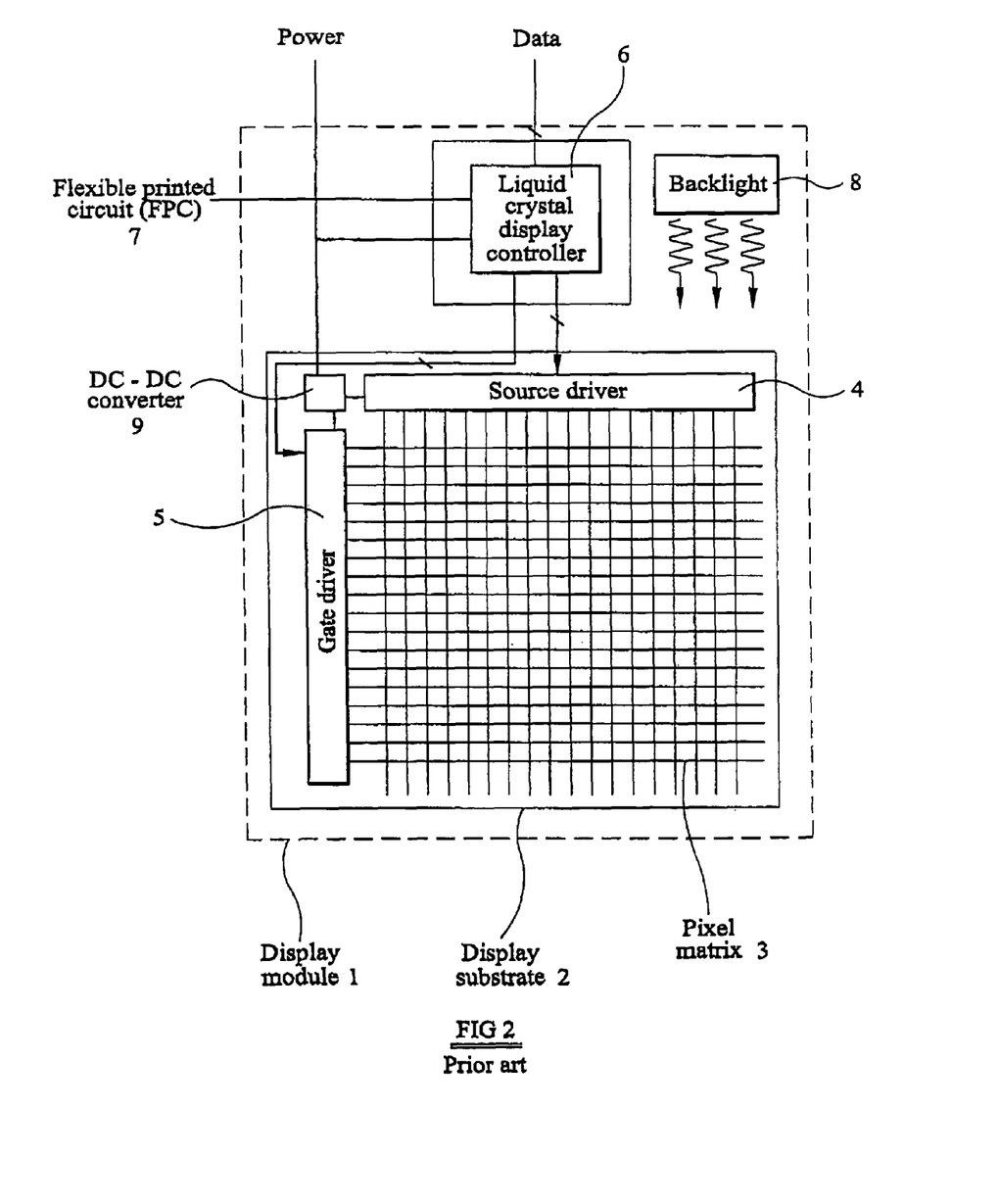
FIG. 2 is a block schematic diagram of another known type of AMLCD.

In order to reduce the number of components, and hence the cost, of the display module 1, it is desirable to integrate the DC-DC converter 9 onto the display substrate 2, as shown in FIG. 2 of the accompanying drawings. A problem with integrating the DC-DC converter 9 onto the display substrate 2 is that the TFT circuits constituting such an integrated converter do not operate unless a supply voltage significantly higher than that supplied to the LCDC 6 is provided.

A known DC-DC converter that has been suggested as suitable for integration onto the display substrate is disclosed in Y. Nonaka et. al. "*A DC-DC Converter Circuit Integrated into a Poly-Si TFT-LCD Containing a 6-bit DAC*". Society for Information Display, Proceedings, 2003. Although this circuit requires a smaller supply and input signal voltage than other TFT circuitry integrated onto the display substrate, it relies on the supply voltage being larger than the threshold voltage of the constituent transistors. Consequently, this circuit does not allow power consumption to be minimised since the display module must be supplied with a voltage larger than that required by the LCDC alone.

A voltage-boosting circuit suitable for integration onto the display substrate that overcomes the problem of high TFT threshold voltages is disclosed in U.S. Pat. No. 6,404,271. This publication describes a version of the well-known Dickson charge-pump circuit which is disclosed in J. Dickson. "*On-chip high-voltage generation in MNOS integrated circuits using an improved voltage multiplier technique*". IEEE Journal of Solid State Circuits, June 1976 in which the switching elements are formed by gated PIN diodes. The PIN diodes allow the use of a lower power supply voltage.

However, a problem with this circuit is that it is inefficient. The PIN diodes present a significant on resistance and capacitance and a significant leakage current. This acts to reduce the output voltage and drive capability of the circuit.

SUMMARY OF THE INVENTION

An embodiment of the invention provides an active matrix liquid crystal display comprising an active matrix liquid crystal arrangement and a DC-DC converter comprising. A voltage increasing circuit converts a first supply voltage from an external power source to a second higher supply voltage for powering the arrangement. A photovoltaic generator powers the circuit from incident light at least during start-up of the display.

The display may comprise a display substrate with the arrangement and the converter being integrated on the substrate. The arrangement and the converter may comprise thin film transistors, such as polysilicon transistors.

The circuit may be arranged to power itself following start-up of the display. The circuit may have a power supply input and a power supply output connected to the power supply input via a diode which is reverse-biased during start-up of the display. The display may comprise a light for illuminating the display and for supplying the incident light to the generator at least during start-up of the display. The light may comprise a backlight or a frontlight. The arrangement may comprise an active matrix liquid crystal array and source and gate line drivers.

The circuit may comprise a pulse generator and a charge pump.

The generator may comprise at least one photovoltaic diode. The or each diode may be a thin film lateral diode. The or each diode may be a PIN diode, such as a gated PIN diode.

The generator may be arranged to generate an open circuit voltage which is greater than the first supply voltage. The open circuit voltage may be greater than the second supply voltage.

The display may comprise a remote display controller arranged to be powered by the external power source. The controller may comprise a CMOS integrated circuit.

It is thus possible to provide a display in which a DC-DC converter can be integrated on a display substrate while operating from an external supply voltage which is substantially less than, for example, the threshold voltage of integrated transistors, such as thin film transistors. An efficient arrangement may be provided, for example with the transistors of the voltage increasing circuit being thin film transistors. A display of low power consumption can be provided with operation, for example, on a relatively low supply voltage suitable for CMOS integrated circuits.

DETAILED DESCRIPTION OF THE PREFERRED EMBODIMENTS

Like reference numerals refer to like parts throughout the drawings.

Figure 3:
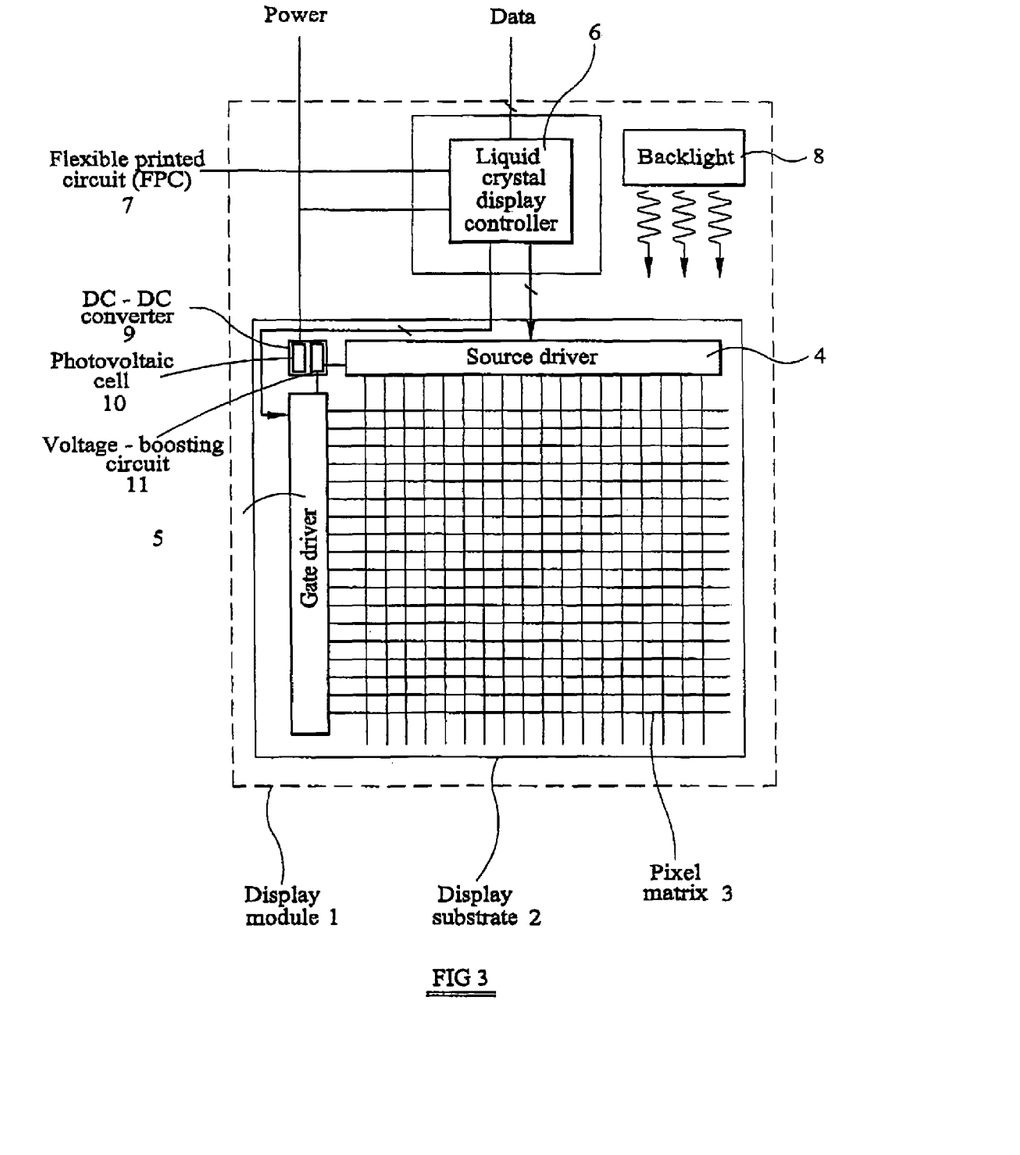
FIG. 3 is a block schematic diagram of an AMLCD constituting an embodiment of the invention.

The ACD module 1 shown in FIG. 3 differs from that shown in FIG. 2 in that the DC-DC converter 9 integrated on the display substrate 2 comprises a photovoltaic cell 10 and a voltage increasing or boosting circuit 11. In particular, the converter 9 shown in FIG. 2 is intended to convert the power supply voltage supplied to the controller 6 to a high value suitable for powering the active matrix arrangement comprising the pixel matrix 3 and the source and gate line drivers 4 and 5. In the case of the display module 1 shown in FIG. 3, the photovoltaic cell 10 is disposed in a position on the substrate 2 so as to receive light from the backlight 8 and generate sufficient power at a sufficiently high voltage for the circuit 11 to boost the voltage of the incoming power supply to a value suitable for powering the matrix 3 and the drivers 4 and 5. In particular, the photovoltaic cell is required to operate at least during start-up of the display to supply sufficient power at a sufficient voltage for the circuit 11 to convert the incoming power supply voltage to a higher value suitable for powering the rest of the TFT circuitry on the substrate 2.

If the module is of a type having a frontlight, the cell 10 may be positioned so as to receive light from the frontlight. As an alternative, the cell 10 may be positioned so as to receive ambient light.

Although it is possible for the circuit 11 to be powered by the cell 10 after start-up of the module 1, it is also possible, and generally more convenient, for the circuit 11 to power itself by supplying the output power supply voltage to its power supply input. Thus, if the backlight 8 is not required for display purposes after start-up, it may be switched off so as to reduce power consumption of the module 1.

Figure 4:
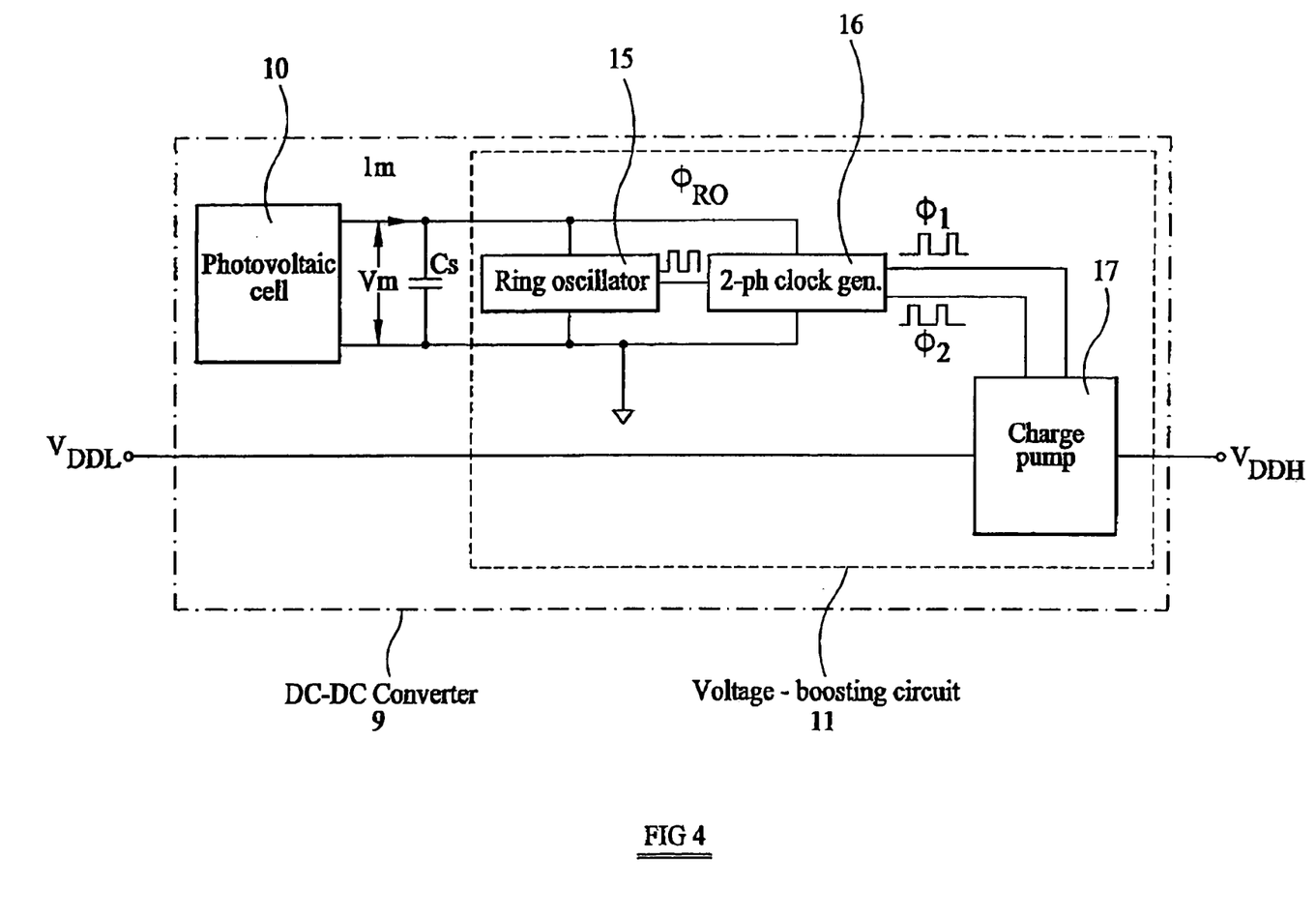
FIG. 4 is a block circuit diagram of a DC-DC converter of the display of FIG. 3.

An arrangement suitable for use as the converter 9 is Illustrated in more detail in FIG. 4. A reservoir or smoothing capacitor $C_S$ is connected across the supply output leads of the photovoltaic cell 10. The supply output leads are connected to the supply inputs of a ring oscillator 15 and a two-phase clock generator 16. The cell 10 supplies a supply voltage $V_m$ and a supply current $I_m$. The ring oscillator, which may be of conventional or known type and will not be described further, supplies output clock signals $\Phi_{RO}$ to the clock generator 16, which converts the clock pulses into two phase non-overlapping clock pulses $\Phi_1$ and $\Phi_2$. The two phase clock pulses are supplied to a charge pump 17 having a power supply input $V_{DDL}$ for receiving the supply voltage for the module 1 supplied directly to the controller 6. The charge pump 17 converts this supply voltage to a higher supply voltage $V_{DDH}$, which is used to supply all the remaining circuits on the display substrate 2.

Figure 5:
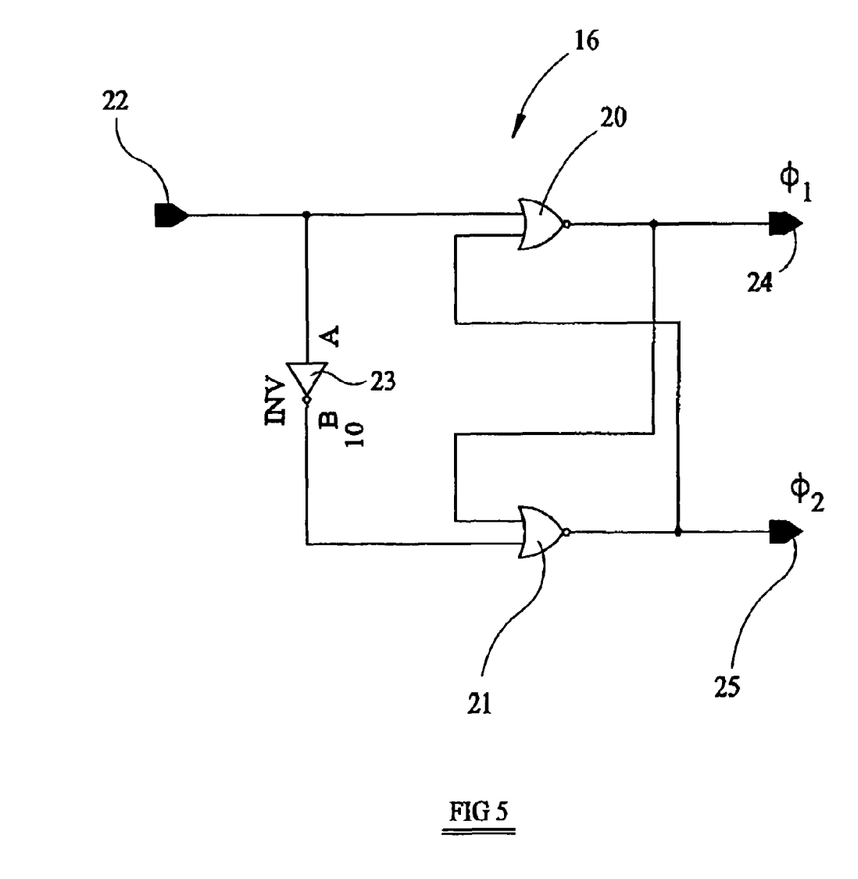
FIG. 5 is a circuit diagram of a two-phase clock generator of the converter of FIG. 4.

FIG. 5 illustrates an example of a clock pulse generator which is suitable for use in the converter of FIG. 4. The generator 16 comprises cross-coupled NOR gates 20 and 21 forming a conventional reset-set flip-flop. The spare input of the gate 20 is connected to the input 22 of the generator, which is connected via an inverter 23 to the spare input of the other gate 21. The non-overlapping two phase clock pulses $\Phi_1$ and $\Phi_2$ are supplied to the outputs 24 and 25 of the generator 16.

Figure 6:
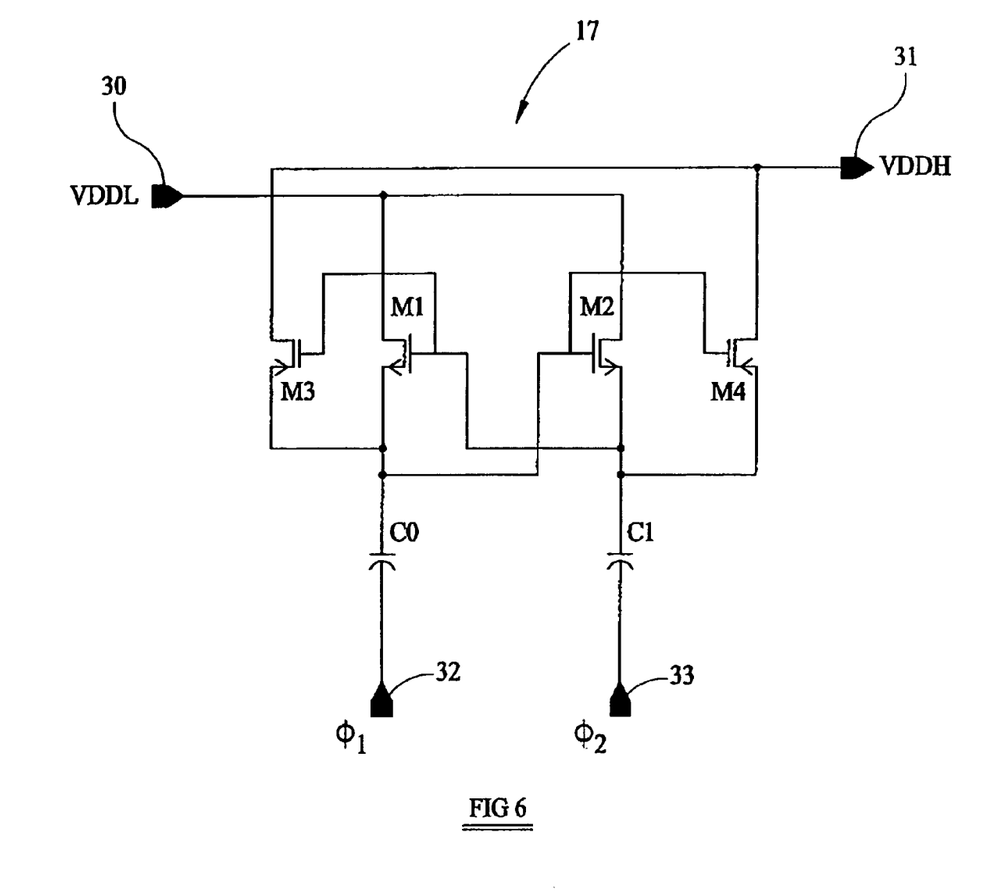
FIG. 6 is a circuit diagram of a charge pump of the converter of FIG. 4.

FIG. 6 illustrates an example of the charge pump 17 of FIG. 4. The charge pump 17 comprises polysilicon thin film transistors M1 to M4 and capacitors C0 and C1. The pump 17 has a supply input 30 for receiving the supply voltage $V_{DDL}$ and a supply output 31 for supply the supply voltage $V_{DDH}$ to the rest of the circuitry on the display substrate 2. Clock inputs 32 and 33 receive the two-phase clock signals $\Phi_1$ and $\Phi_2$ from the clock generator 16. The charge pump is of a conventional type and its operation will not therefore be described further.

Any number of stages may be cascaded together to form the charge pump 17 with the number of such stages depending on the increase in voltage from $V_{DDL}$ to $V_{DDH}$ which is required.

Figure 7:
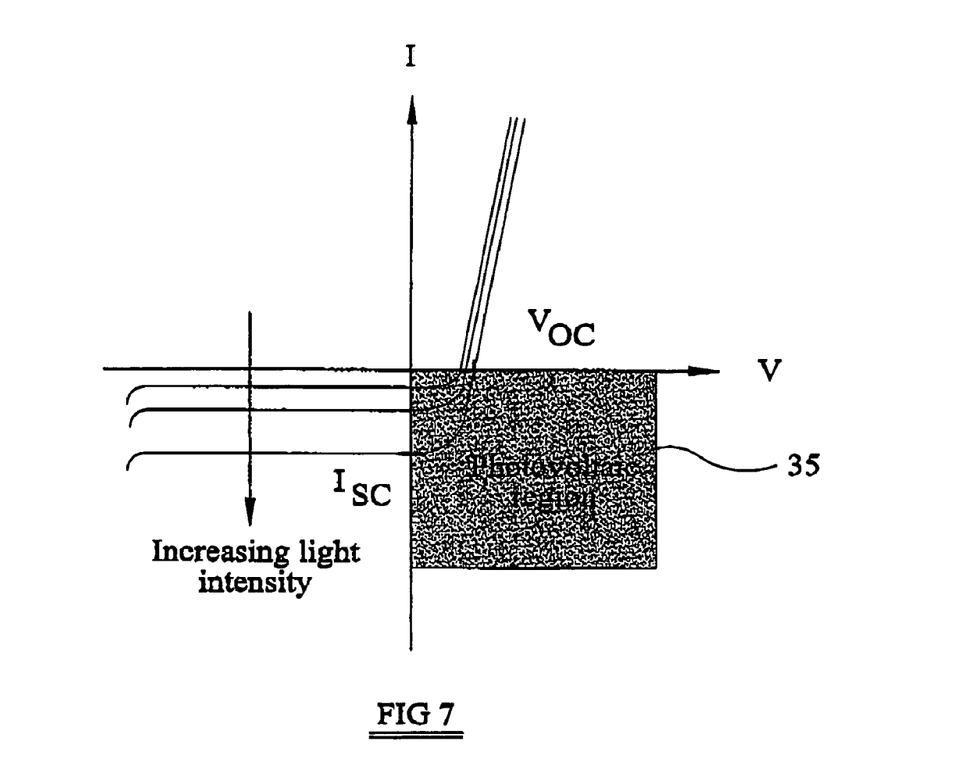
FIG. 7 illustrates the current and voltage generated by a photovoltaic diode with light intensity as a parameter.
Figure 8:
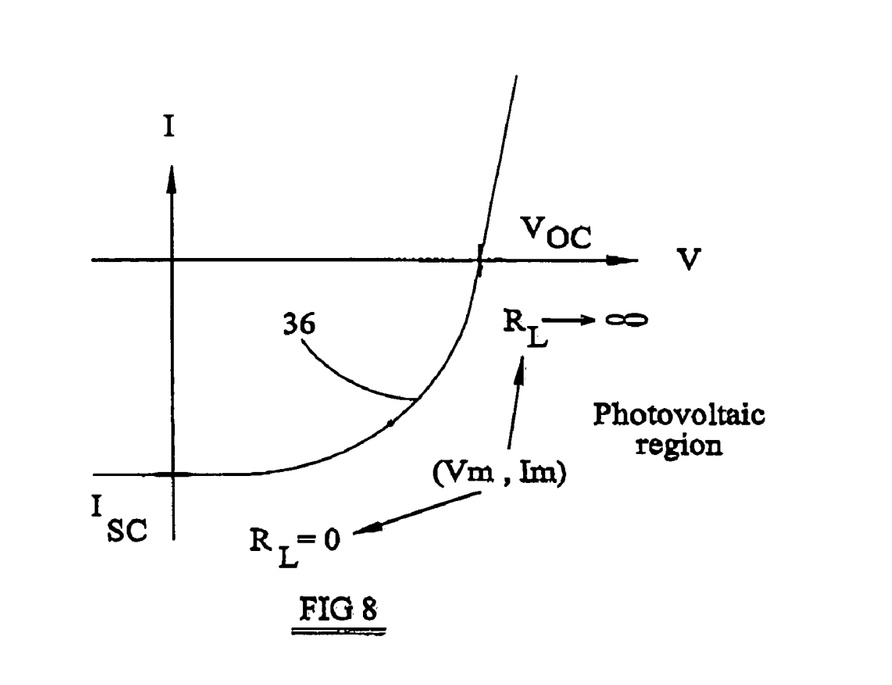
FIG. 8 is a graph of current against voltage illustrating the effect of loading on a photovoltaic diode.

The converter 9 operates as follows. The photovoltaic cell 10 generates the voltage $V_m$ and the current $I_m$, which are dependent on the incident light intensity and on the load applied to the cell. FIG. 7 illustrates the characteristics of a typical photovoltaic cell for different incident light intensities. The cell is operated in the photovoltaic region illustrated at 35 and FIG. 8 illustrates how the voltage and current vary with load for a typical incident light intensity.

When the load resistance $R_L$ is equal to zero, the cell supplies the short-circuit current $I_{SC}$ at zero voltage. Conversely, with a very large load resistance tending to infinity, the cell generates zero current at the open circuit voltage $V_{OC}$. For intermediate values of load resistance, the voltages and currents obtained may be found from the curve 36.

During start-up of the display module 1, power is supplied to the power input of the module and light from the backlight 8 is incident on the photovoltaic cell 10. Provided the leakage current of the circuit 11 is less than the output current $I_m$ of the cell 10, the capacitor $C_S$ is charged and the voltage across it rises towards the open circuit voltage $V_{OC}$ of the cell. When this voltage is greater than a threshold voltage required by the ring oscillator 15 to operate, the ring oscillator 15 turns on and produces an output pulse. In order to produce the output pulse, the ring oscillator 15 consumes power so that the voltage across the capacitor $C_S$ falls. If the power consumed by the ring oscillator 15 exceeds that generated by the cell 10, the voltage across the capacitor $C_S$ falls below the threshold voltage of the ring oscillator 15, which thus switches off. The capacitor $C_S$ is charged up until it supplies a voltage greater than the threshold voltage to the ring oscillator, which then produces another pulse.

If the power generated by the cell 10 exceeds the power consumption of the ring oscillator 15 and the generator 16, the voltage across the capacitor $C_S$ increases towards the cell open circuit voltage $V_{OC}$ and the ring oscillator 15 operates continuously. The frequency of the clock pulses $\Phi_{RO}$ is proportional to the supply voltage $V_m$ and hence is a function of the incident light intensity. The two phase clock signals $\Phi_1$ and $\Phi_2$ are supplied to the charge pump 17, which increases the supply voltage $V_{DDL}$ to a value $V_{DDH}$ sufficient for the thin film transistor circuits of the display module 1 to operate.

Figure 9:
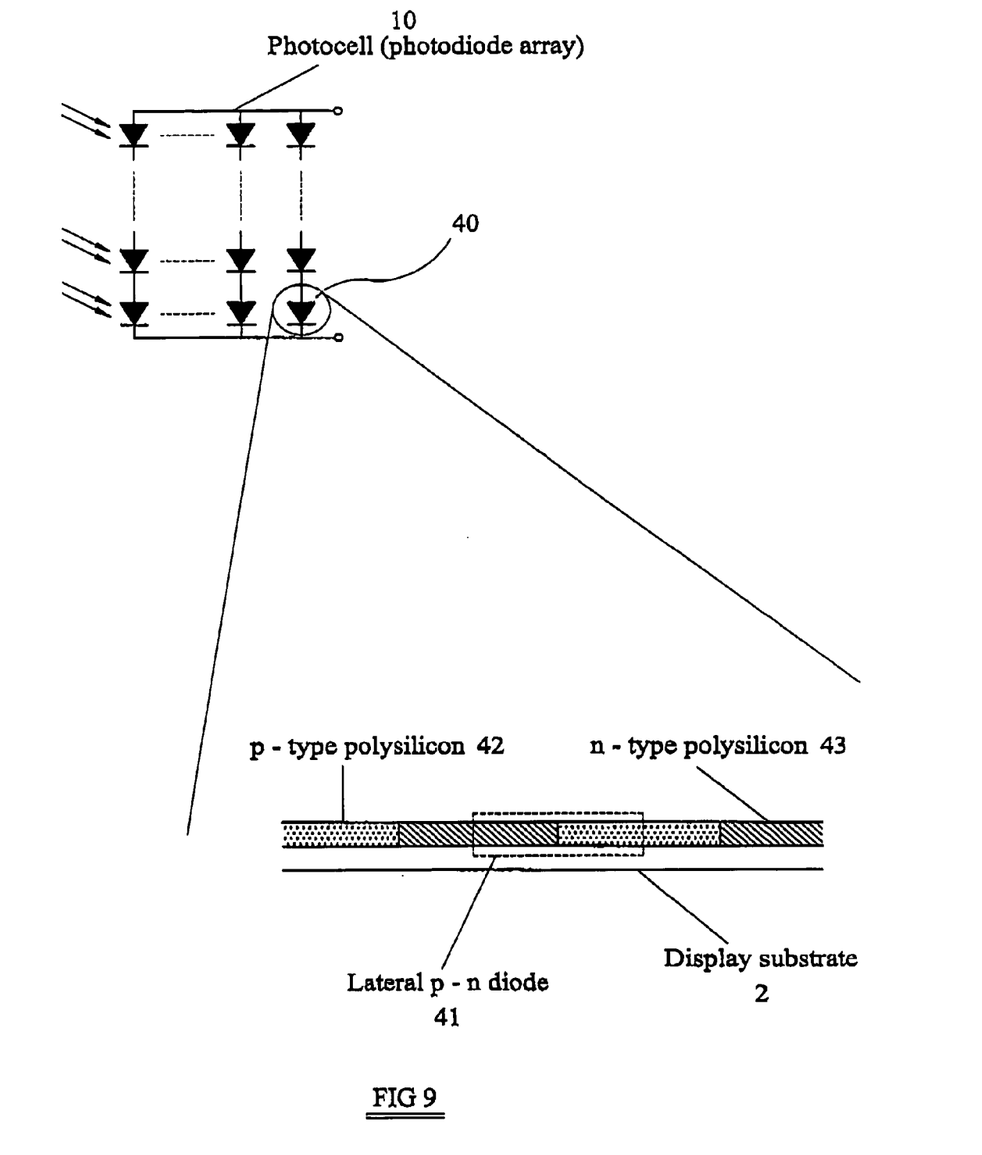
FIGS. 9 to 11 illustrate diagrammatically photovoltaic diodes for use in the converter of FIG. 4.

FIG. 9 illustrates an example of the photovoltaic cell, comprising an array of series and parallel connected photodiodes. The photodiodes are connected in series and parallel so as to provide sufficient supply voltage $V_m$ and supply current $I_m$ to ensure that the converter 9 operates when the cell 10 is illuminated by the backlight 8. FIG. 9 also illustrates the construction of one of the photodiodes, such as 40, in cross section. The photodiode is in the form of a thin film lateral photodiode with a lateral p-n junction 41 formed on the display substrate 2. Regions of p-type and n-type polysilicon are illustrated at 42 and 43.

Figure 10:
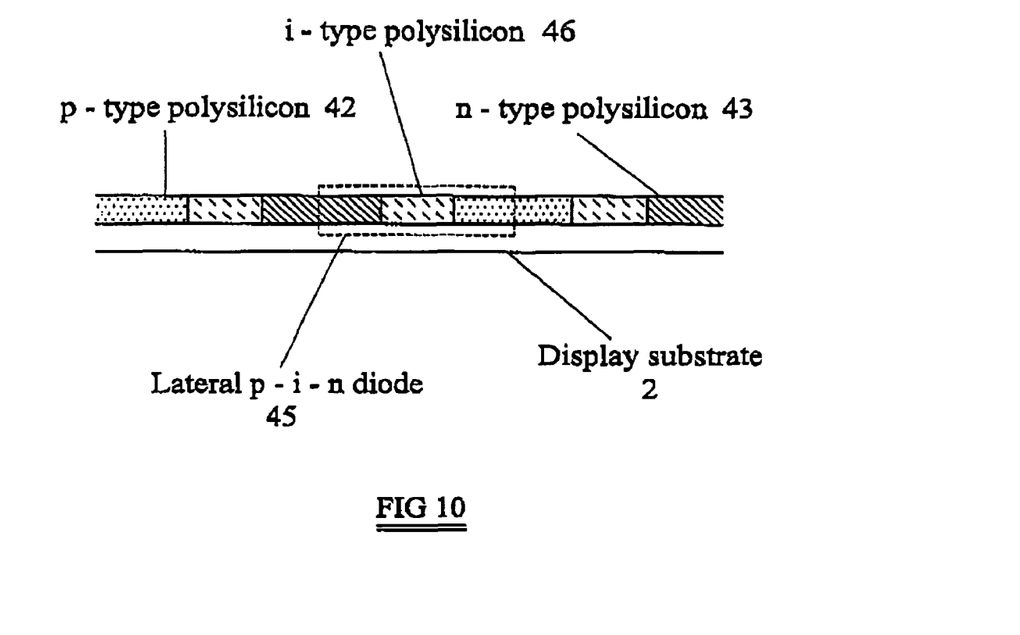

FIG. 10 illustrates an alternative type of photodiode in the form of a PIN thin film lateral photodiode. The construction of such a diode is shown at 45 and includes an intrinsic region of I-type polysilicon 46. Diodes of this type are known and are disclosed, for example, by H. Zimmermann et al, "*Large-Area Lateral P-I-N Photodiode on SOI*", IEEE Transactions on Electron Devices, February 2002. An advantage of such a PIN diode is that the area available for conversion of light energy to electrical energy is increased compared with standard PN junctions. In order to maintain efficient operation, the intrinsic region should be fully depleted of charge carriers and this places a limit on the width of the intrinsic region and hence on the area available for conversion.

Figure 11:
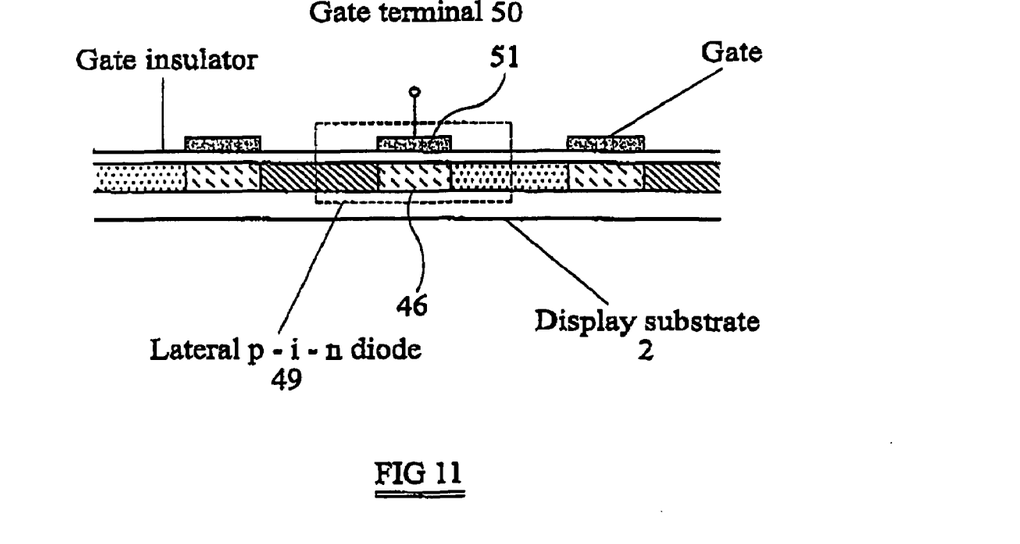

In order to increase the area available for conversion, the PIN diodes may be in the form of gated lateral PIN diodes as shown in FIG. 11. Devices of this type have a gate terminal 50 and are disclosed, for example, in U.S. Pat. No. 6,111,305. Application of a suitable voltage to the gate terminal 50 of each diode 49 allows the intrinsic region 46 below the gate 51 to remain fully depleted. The width of the intrinsic region 46 may therefore be substantially increased so that the area available for conversion of light is also increased.

Figure 12:
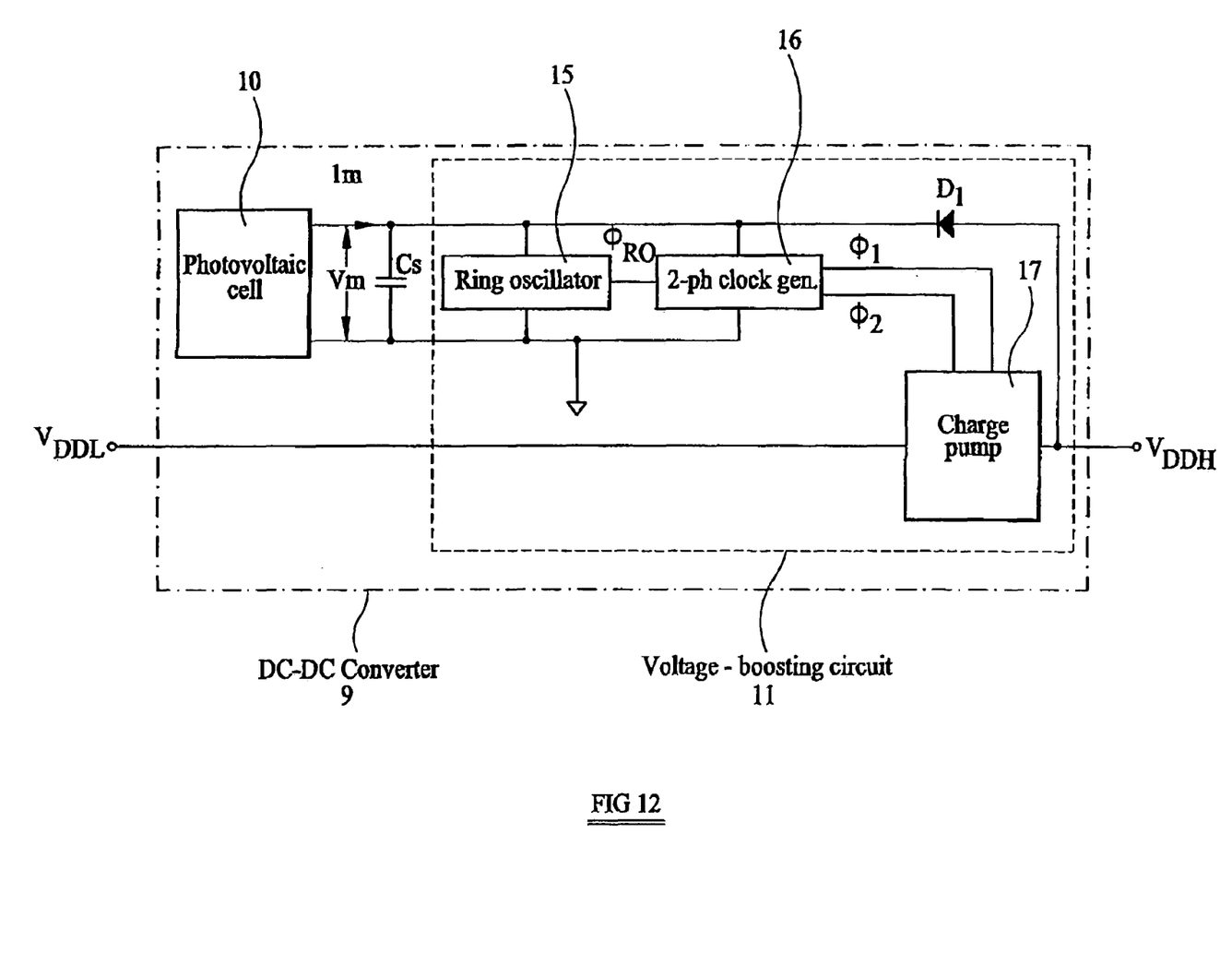
FIG. 12 is a block circuit diagram of another DC-DC converter for use in the display of FIG. 3.

The converter shown in FIG. 12 differs from that shown in FIG. 4 in that a diode D1 is connected between the output of the charge pump 17 and the power supply inputs of the ring oscillator 14 and the clock generator 16. The diode $D_1$ is oriented so as to be reverse-biased when the output voltage $V_m$ of the photovoltaic cell 10 is greater than the output voltage $V_{DDH}$ of the charge pump 17 so that the cell 10 supplies power to the ring oscillator 15 and the clock generator 16 but not to the rest of the display module 1. Conversely, when the output voltage $V_m$ of the cell 10 is less than the output voltage $V_{DDH}$ of the charge pump 17, the diode is forward biased so that the charge pump 17 supplies power to the ring oscillator 15 and the clock generator 16 as well as to the rest of the circuitry on the display substrate 2.

Figure 13:
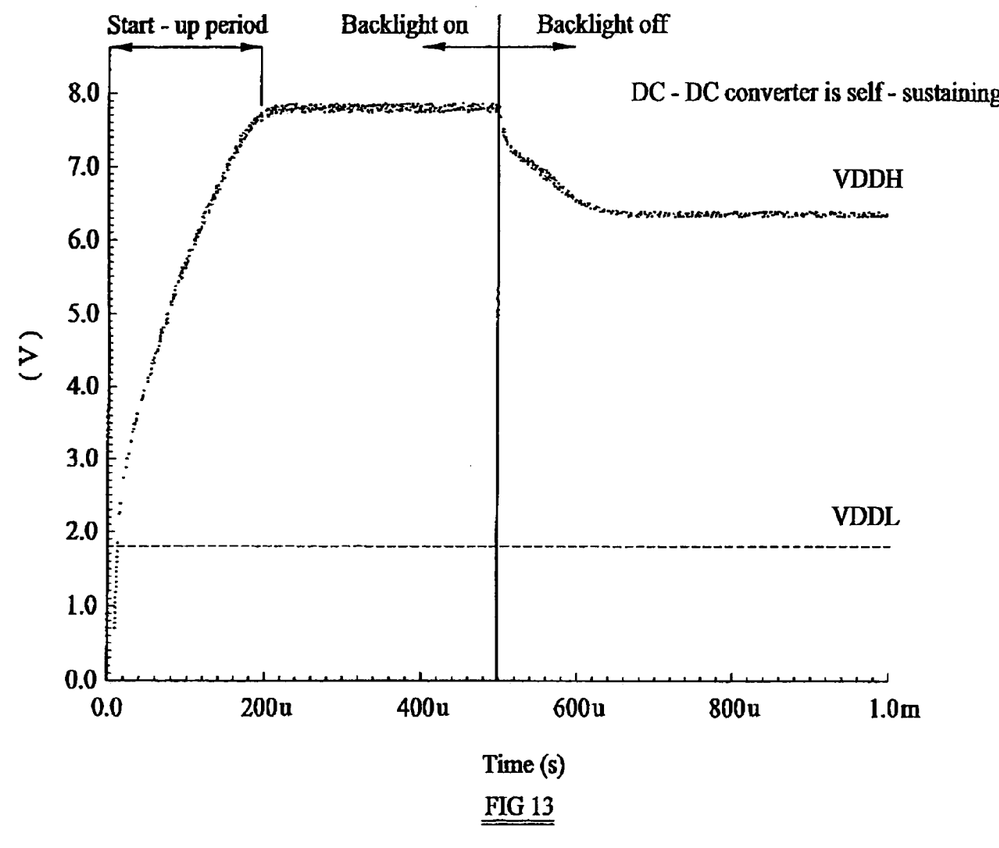
FIG. 13 is a graph of voltage against time illustrating display voltage during and following start-up of the display of FIG. 3 using the converter of FIG. 12.

This arrangement allows the backlight 8 to be switched off following start-up of the display module if the backlight is not required for display purposes. As illustrated in FIG. 13, which shows the voltage at the supply inputs of the ring oscillator 15 and the clock generator 16 during and following start-up of the display module 1, the backlight 8 is illuminated so that, during an initial start-up period, the voltage across the capacitor $C_S$ rises to a value suitable for maintaining sustained operation of the oscillator 15 and the generator 16. The voltage is maintained until the charge pump 17 has had an opportunity of increasing the supply voltage $V_{DDL}$ to a value $V_{DDH}$ sufficient to power the circuitry on the display substrate 2. The backlight is then switched off but the diode $D_1$ remains reverse-biased until the voltage across the capacitor $C_S$ decays to a value equal to the increased supply voltage $V_{DDH}$ minus the forward voltage drop across the diode $D_1$. The cell 10 does not produce any substantial electrical output when the backlight is switched off but the power supply to the oscillator 15 and the generator 16 is maintained from the output of the charge pump 17 via the diode $D_1$.

Such an arrangement allows the power consumption of the display module 1 to be minimised by allowing the backlight 8 to be switched off when it is not required for display purposes and following the start-up of the module. For example, in the case of a transflective display where the ambient light is sufficient for the display to be readable in the reflective mode, the backlight can be switched off following start-up of the display. The backlight need therefore only be switched on for a period sufficient for the converter 9 to become "self-sufficient". However, if the conditions require that the backlight remains switched on, for example because the ambient illumination is insufficient, the display is commanded to operate in the transmissive mode, or the display is a transmissive-only display. The backlight may remain illuminated and the cell 10 continues to supply power to the oscillator 15 and the generator 16 unless the output voltage $V_{DDH}$ of the charge pump 17 minus the forward voltage drop across the diode $D_1$ exceeds the output voltage $V_m$ of the cell 10.

What is claimed is:

1. An active matrix liquid crystal display comprising an active matrix liquid crystal arrangement and a DC-DC converter comprising: a voltage increasing circuit for converting a first supply voltage from an external power source to a second higher supply voltage for powering the arrangement; and a photovoltaic generator for powering the circuit from incident light at least during start-up of the display.

2. A display as claimed in claim 1, comprising a display substrate with the arrangement and the converter being integrated on the substrate.

3. A display as claimed in claim 2, in which the arrangement and the converter comprise thin film transistors.

4. A display as claimed in claim 3, in which the transistors are polysilicon transistors.

5. A display as claimed in claim 1, in which the circuit is arranged to power itself following start-up of the display.

6. A display as claimed in claim 5, in which the circuit has a power supply input and a power supply output connected to the power supply input via a diode which is reverse-biased during start-up of the display.

7. A display as claimed in claim 1, comprising a light for illuminating the display and for supplying the incident light to the generator at least during start-up of the display.

8. A display as claimed in claim 7, in which the light comprising a backlight or a frontlight.

9. A display as claimed in claim 1, in which the arrangement comprises an active matrix liquid crystal array and source and gate line drivers.

10. A display as claimed in claim 1, in which the circuit comprises a pulse generator and a charge pump.

11. A display as claimed in claim 1, in which the generator comprises at least one photovoltaic diode.

12. A display as claimed in claim 11, in which the or each diode is a thin film lateral diode.

13. A display as claimed in claim 11, in which the or each diode is a PIN diode.

14. A display as claimed in claim 13, in which the or each PIN diode is a gated PIN diode.

15. A display as claimed in claim 1, in which the generator is arranged to generate an open circuit voltage which is greater than the first supply voltage.

16. A display as claimed in claim 15, in which the open circuit voltage is greater than the second supply voltage.

17. A display as claimed in claim 1, comprising a remote display controller arranged to be powered by the external power source.

18. A display as claimed in claim 17, in which the controller comprises a CMOS integrated circuit.

* * * * *